United States Patent Office 2,872,420
Patented Feb. 3, 1959

2,872,420

PROCESS FOR RECLAIMING NYLON

Piet C. Kruyff, New York, N. Y., assignor, by mesne assignments, to Foster Grant Co., Inc., Leominster, Mass., a corporation of Delaware No Drawing. Application July 18, 1956
Serial No. 598,527

7 Claims. (Cl. 260—2.3)

This invention relates to reclaiming of polyamides. In particular it relates to an improved process for isolating high quality linear polyamides from used products and waste.

Linear polyamides, more familiarly known as nylon, are characterized by high strength and tenacity and resistance to heat and moisture. Nylon is commonly used both in the form of fibers and molding powders. However, the high cost of virgin nylon as compared with other synthetic polymers has restricted its use as a molding material. The consumption of nylon, however, is sufficiently considerable so that there are large quantities of discarded nylon goods and nylon waste produced each year. Previously described attempts to reclaim nylon from discarded goods and waste have been either too expensive or have resulted in inferior, discolored material. Further, nylon as has been reclaimed has been found generally unsuitable for use in the common injection molding machines.

One object of this invention is to provide an improved process for reclaiming nylon which results in material of equal quality to virgin nylon.

A further object of this invention is to provide an improved process for reclaiming nylon which is inexpensive.

A still further object of this invention is to provide an improved process of reclaiming nylon which is applicable to all types of nylon and all types of nylon waste and discarded nylon products.

Yet another object of this invention is to provide an improved process for reclaiming nylon where the resultant product is suitable for injection molding with the common injection molding apparatus.

A further object of this invention is to provide an improved process of reclaiming nylon whereby the physical properties of the resultant product are substantially identical to those of the particular original nylon.

Swiss Patent No. 246,263, describes a nylon reclaiming method wherein the starting materials are dissolved in 40 to 50 percent sulfuric acid at room temperature, the insoluble impurities filtered off and the polyamides reprecipitated by the addition of sufficient water to drop the acid concentration below 40 percent. This patent asserts that no degradation or change in molecular weight takes place.

I have noticed, in following the teaching of this patent, that it is extremely difficult to obtain uniform, reproducible products; that irregular agglomeration will often occur; that sulfuric acid is almost always occluded in the final product; and that the final product is frequently dark colored. I have also noticed that, where an injection molding powder is desired, the final product of the Swiss process is often unsuitable.

However, I have found that by modifying this process by certain steps described below, I can substantially avoid all the above stated disadvantages and obtain a uniform, acid-free, substantially pure, clear product of controllable particle size. My modification comprises principally adding to the nylon solution before precipitation a small quantity of a liquid alcohol which is miscible with water and reactive with sulfuric acid to form a half ester, and contacting the washed precipitated product with a dilute aqueous solution of a base compatible with nylon, preferably hexamethylene diamine. I prefer to dry my product rapidly in a high vacuum and heat below the melting point. In finishing the product for use in an injection molding machine, I work the material mechanically under an inert atmosphere as, for example, through a screw extruder.

A specific example of this method is described below.

*Example*

The starting material was stockings fabricated from the linear polymer of adipic acid and hexamethylene diamine (nylon-66). Approximately 480 grams of 96 percent sulfuric acid were slowly added to 540 grams of water in a stainless steel vessel equipped with a variable stainless steel agitator adjusted to be running slowly. After cooling the resultant 46 percent acid to room temperature, 200 grams of the stockings were added to the acid solution over a thirty-minute period with slow agitation to form a thick solution. The solution was filtered through fuller's earth and an acid-resistant filter funnel to remove suspended impurities and dyes. After filtration the filtrate was treated with 4 grams of methyl alcohol. Then 380 grams of water were slowly added with slow agitation. It was noted that local precipitate formed and redissolved until a considerable portion of the water had been added, after which a persistent granular precipitate resulted. The precipitate was then washed with water until neutral and then allowed to set for thirty minutes in a 2 percent hexamethylene diamine solution prepared as follows: 25 percent by weight of nylon-66 was refluxed for 14 hours in 46 percent sulfuric acid to give 90 percent hydrolysis to hexamethylene diamine sulfate and adipic acid. The mixture was cooled to 18° C., thus precipitating the adipic acid which was then filtered off. The filtrate was then treated with lime to remove the sulfate as insoluble calcium sulfate. The calcium sulfate was then filtered off and the liming process repeated until the filtrate was substantially sulfate free. The filtrate was then adjusted to 2 percent solids content.

After contacting with the 2 percent hexamethylene diamine solution, the nylon precipitate was washed with water to remove excess diamine and then removed to a vacuum drying chamber under less than 4 millimeters' vacuum and a temperature of 165–175° F.

After drying, the resultant product comprised uniform, free-flowing granules, which could be fed directly into an extruder. Once extruded, the material could be ground and fed into an injection molding machine. For dark colored objects, this was satisfactory as regards compactness, toughness and strength.

Where light colors are desired, it is preferable to evacuate air from dried powdered product and maintain an atmosphere of inert gas, such as nitrogen, during any initial mechanical working involving heat. Thus, extrusion is preferably done with an air-evacuated powder in an inert atmosphere. Where injection molding is to be done, the extruded melt is ground under an inert atmosphere to a particle size larger than 1/8 inch cubes. These granules can then be fed into an ordinary injection molding machine without any further air-exclusion provisions. When molded at similar temperatures, pressures and time cycles as virgin polyhexamethylene adipamide (i. e. nylon-66), the refined granules yielded clear, well-formed, compact, tough, uniform molded products substantially identical in all their physical properties to the virgin nylon molded products.

The example given above deals with starting materials of nylon-66. However, I have found that this process can be repeated with substantially identical results where the starting materials are based on 6-nylon (caprolactam), 610-nylon (sebacic acid), or nylon-11

$$NH_2(CH_2)_{10}—COOH$$

I prefer to use methanol because of its outstanding effectiveness and low cost. Somewhat less effective but nevertheless useful in this invention are other liquid alcohols which are miscible with water and reactive to form a half ester, with sulfuric acid, as for example: ethanol, propyl alcohol, isopropyl alcohol, the butylalcohols, the amyl alcohols, ethylene glycol, glycerol, etc.

I prefer to use hexamethyene diamine as my nylon-compatible base because of the outstanding clarity of the resultant product. I can also use other compatible bases such as ethylene diamine, morpholine and ammonia. However, such other bases either give a darker color or slight changes in physical properties.

In addition to the preferred drying conditions described above, namely, the high vacuum and a temperature below the melting point, drying can also be accomplished though less efficiently, in an inert atmosphere or dry steam atmosphere.

I claim:

1. A method for preparing substantially pure linear polyamide from linear polyamide-containing stock, comprising dissolving the stock in 40 to 50 percent sulfuric acid at room temperature, removing any undissolved impurities, adding a small quantity of liquid alcohol selected from the group consisting of methyl alcohol, ethyl alcohol, propyl alcohol, isopropyl alcohol, the butyl alcohols, the amyl alcohols, ethylene glycol and glycerol adding sufficient water to reprecipitate the linear polyamide, washing the precipitate with a dilute aqueous solution of a base selected from the group consisting of hexamethylene diamine, ethylene diamine, morpholine and ammonia, washing the contacted precipitate with water and drying the precipitate; said polyamide being selected from the group consisting of polyamides of adipic acid-hexamethylene diamine, caprolactam, sebacic acid, and 10-amino-1-carboxy-decane.

2. The method of claim 1 wherein the alcohol is methyl alcohol.

3. The method of claim 1 wherein the base is hexamethylene diamine.

4. The method of claim 1 wherein the alcohol is methyl alcohol and the base is hexamethylene diamine.

5. The method of claim 1 wherein the precipitate-drying is accomplished by vacuum drying at a temperature below the polyamide melting point.

6. The method of claim 1 wherein the precipitate-drying is accomplished by vacuum drying at a temperature below the polyamide melting point and the dried product passed through an extruder.

7. The method of claim 1 wherein the precipitate-drying is accomplished by vacuum drying at a temperature below its melting point and the resultant dried product has its surrounding air removed therefrom and an inert atmosphere imposed and is passed through an extruder under an inert atmosphere to form an injection molding compound having granules more than ⅛ inch in size.

References Cited in the file of this patent

UNITED STATES PATENTS 2,407,896    Myers _____ Sept. 17, 1946

FOREIGN PATENTS 670,693    Great Britain _____ Apr. 23, 1952